United States Patent [19]

Hoshi

[11] Patent Number: 5,343,457

[45] Date of Patent: Aug. 30, 1994

[54] DISK DRIVE APPARATUS

[75] Inventor: Akio Hoshi, Saitama, Japan

[73] Assignee: Canon Kabushiki Kaisha, Tokyo, Japan

[21] Appl. No.: 924,856

[22] Filed: Aug. 4, 1992

[30] Foreign Application Priority Data

Aug. 19, 1991 [JP] Japan .................................. 3-230921
Aug. 19, 1991 [JP] Japan .................................. 3-230922
Aug. 19, 1991 [JP] Japan .................................. 3-230923
Aug. 19, 1991 [JP] Japan .................................. 3-230924
Dec. 20, 1991 [JP] Japan .................................. 3-338612

[51] Int. Cl.$^5$ ............................................ G11B 17/04
[52] U.S. Cl. ................................ 369/77.2; 360/99.06
[58] Field of Search ............................ 369/77.2, 75.1; 360/99.06, 98.07

[56] References Cited

U.S. PATENT DOCUMENTS

| | | | |
|---|---|---|---|
| 4,641,211 | 2/1987 | Okita et al. | 360/99.06 |
| 4,679,106 | 7/1987 | Okita et al. | 360/99.06 |
| 4,847,713 | 7/1989 | Fujiwara | 360/99.06 |
| 5,126,899 | 6/1992 | Kanazawa | 360/99.06 |
| 5,144,508 | 9/1992 | Noda et al. | 360/99.06 |

Primary Examiner—Richard A. Bertsch
Assistant Examiner—Alfred Basichas
Attorney, Agent, or Firm—Robin, Blecker, Daley & Driscoll

[57] ABSTRACT

A disk drive apparatus according to this invention is arranged to record or reproduce information on or from a disk, which serves as a recording medium, by moving a head thereon in a predetermined direction while rotating the disk. The disk drive apparatus includes, in one preferred form, an operating member turnably supported on a base, and a holder for holding the disk within the disk drive apparatus in such a manner as to cause the disk to selectively move to a first location where the disk can be inserted or ejected and to a second location where information can be recorded or reproduced on or from the disk. The holder is arranged to move with the insertion of the disk in an inserting direction of the disk, while the operating member turns in a predetermined direction in association with the holder moving in the inserting direction of the disk. When the holder turns through a predetermined angle, the holder reaches the second location.

22 Claims, 9 Drawing Sheets

DISK DRIVE APPARATUS

BACKGROUND OF THE INVENTION

Field of the Invention

The present invention relates to a disk drive apparatus for carrying out recording or reproduction of information on or from a disk.

Description of the Related Art

As one example of a disk drive apparatus, a disk drive apparatus is known which carries out recording or reproduction of information on or from a disk-shaped recording medium such as a magnetic disk or a laser disk. Such a disk drive apparatus is generally arranged in the following manner. When a disk which serves as a recording medium is externally inserted into the disk drive apparatus, the inserted disk is set in an ejectable state and starts to rotate by the driving of a motor. Recording or reproduction of information on or from the rotating disk is carried out by causing a head to move in contact with or in proximity to the rotating disk. In the aforesaid arrangement, the head is provided on a carriage so that the head is made to move (seek) in the radial direction of the disk by the motor.

The above-described disk drive apparatus has a base for supporting various constituent members such as inserting/ejecting means for carrying out insertion or ejection of a disk cassette, disk rotation driving means for causing the disk to rotate by the motor, head seek means for causing the head to move to an arbitrary track position in the radial direction of the disk, and head loading means for loading or unloading the head onto or from the disk. In addition, a control circuit for controlling the entire disk drive apparatus, a connector for an electrical power source and the like are provided on the base, and the control circuit is connected to a host machine and the like through an interface.

In some cases, such a disk drive apparatus is constructed as an independent apparatus for use as an external storage unit for an electronic apparatus such as a personal computer or a word processor. However, in general use, the disk drive apparatus is incorporated into the body of the electronic apparatus. To provide a far smaller, portable electronic apparatus, there has been a strong demand for reductions in the size, weight and thickness of the above-described disk drive apparatus.

However, since the conventional disk drive apparatus has the following problems, it has been difficult to reduce the size, weight and thickness of the apparatus.

Firstly, in the conventional disk drive apparatus, a slide plate movable along opposite sides of the cassette guide and a cam formed in the slide plate are employed as a loading mechanism for causing a cassette guide to selectively move to its load position and to its unload position, which cassette guide has a guidance function for inserting, ejecting, loading and unloading the disk cassette. This construction needs a complicated structure and, hence, a large number of parts, and it has been impossible to decrease the width and length of the apparatus. Such disadvantages have made it difficult to reduce the size and weight of the apparatus.

Secondly, in the conventional disk drive apparatus, a head arm provided with the head is disposed on the rear side of the cassette guide (in a rear portion of the disk drive apparatus), and a driving shaft for causing the head air, to move is disposed to extend along the head arm. This construction has the disadvantage of increasing the length and thickness of the apparatus to make it difficult to reduce the size and weight of the apparatus.

Thirdly, in the conventional disk drive apparatus, the cassette guide has a configuration which can accommodate the approximately full face of the disk cassette, and a mechanism for causing the head to move (head seek mechanism) is disposed on the rear side of the cassette guide (in a rear portion of the disk drive apparatus). This construction has the disadvantage of increasing the length and thickness of the apparatus to make it difficult to reduce the size and weight of the apparatus.

Fourthly, in the conventional disk drive apparatus, a head lifter part formed integrally with the cassette guide is employed to cause the head to selectively move to the load position and to the unload position. Particularly when the disk cassette is placed in the unload position, the gap between a 0-side (lower) head and a 1-side (upper) head varies with the position of the head (between the inner circumference and the outer circumference of the disk) by the influence of a curvature of the lifter part due to the urging force of a spring which serves to determine a head pressure acting when the disk cassette is placed in the load position. In particular, if the head is positioned adjacent to the outer circumference of the disk, the gap between the heads becomes small, with the result that the disk cassette may be damaged by interference with the 1-side head during an insertion or ejection operation. This disadvantage hinders a reduction in the thickness of the apparatus.

Summary of the Invention

It is, therefore, an object of the present invention to solve the above-described problems.

Another object of the present invention is to provide a disk drive apparatus which is reduced in size, weight and thickness.

To achieve the above objects, according to one aspect of the present invention, there is provided an improvement in a disk drive apparatus capable of recording or reproducing information on or from a disk, which serves as a recording medium, by moving a head thereon in a predetermined direction while rotating the disk. In the disk drive apparatus, an operating lever supported on a base is pivotally arranged so that a cassette guide for guiding and holding a disk cassette is selectively moved toward its load and unload positions by means of the pivotal motion of the operating lever.

According to another aspect of the present invention, there is provided an arrangement in which a driving shaft for causing the head to move is disposed in proximity to one edge of the disk cassette in such a manner as to extend in the inserting direction of the disk cassette.

According to another aspect of the present invention, there is provided an arrangement in which a cutout portion is formed in the cassette guide for guiding and holding the disk cassette and a head seek mechanism is disposed within the cutout portion.

According to another aspect of the present invention, there is provided an arrangement in which the lateral position of the cassette guide for guiding and holding the disk cassette is displaced toward one side in the apparatus, whereby a space is formed in the apparatus on the other side thereof. Within the space, there are disposed a cassette loading mechanism for selectively moving the cassette guide to the load position and to the unload position, and the head seek mechanism for causing the head to move.

According to another aspect of the present invention, there is provided an arrangement comprising: a head carriage which holds a first head and which is movable in a radial direction of the recording medium, a head arm which is supported on the head carriage and which holds a second head opposite to the first head, and moving means for causing the second head to selectively move to a first location where recording or reproduction of information on or from the recording medium is possible and to a second location where recording or reproduction of information on or from the recording medium is impossible. A longitudinal axis of the head carriage and a moving direction of the head carriage are mutually approximately perpendicular, and the moving means has a support part for supporting, when the second head is positioned at the second location, the head arm in such a manner that the support part extends across the head carriage in the moving direction thereof.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
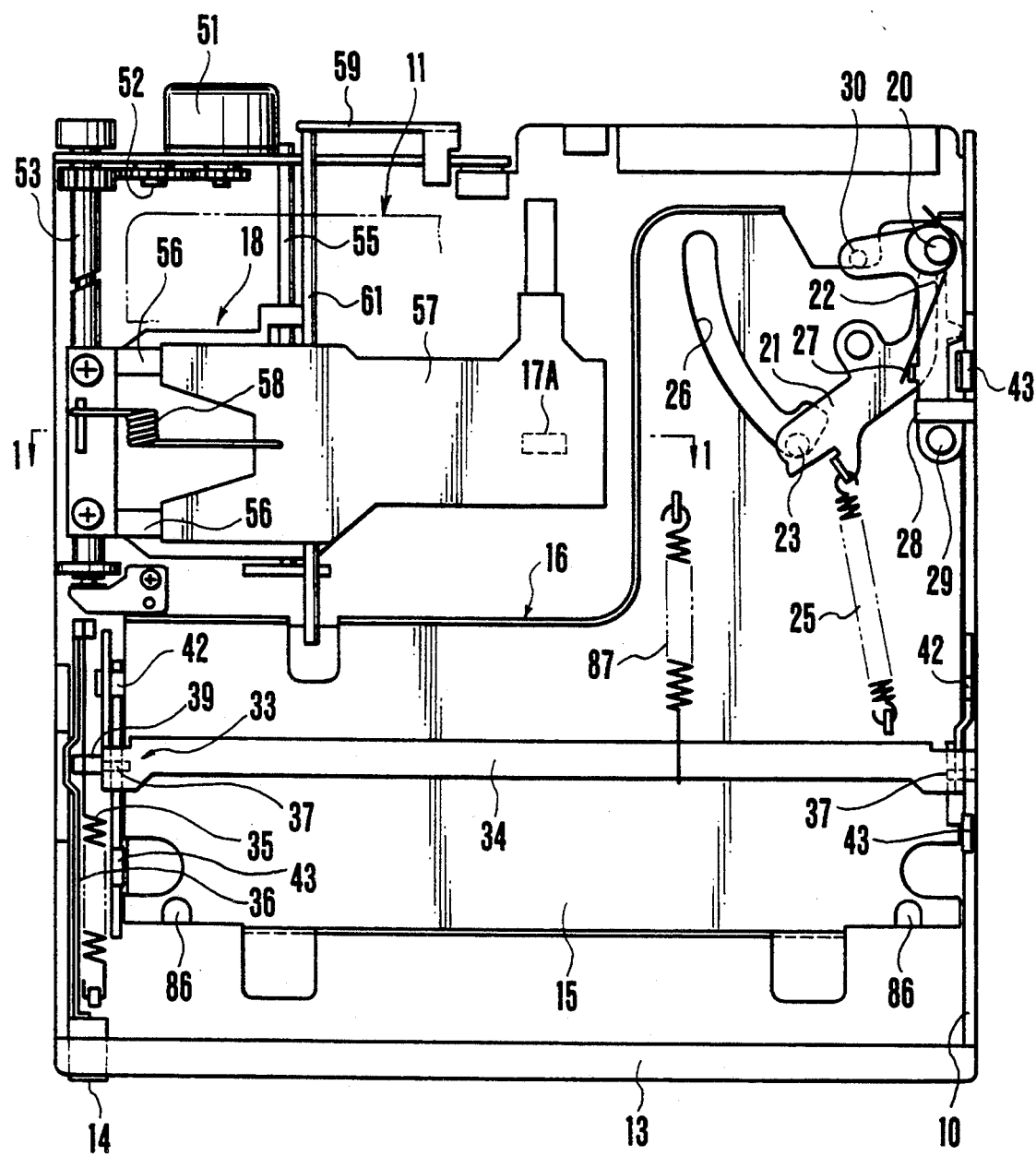
FIG. 1 is a diagrammatic top plan view, with a cover omitted for the sake of clarity, of a state where one embodiment of a disk cassette device according to the present invention is placed when a disk cassette is in its unload position.
Figure 2:
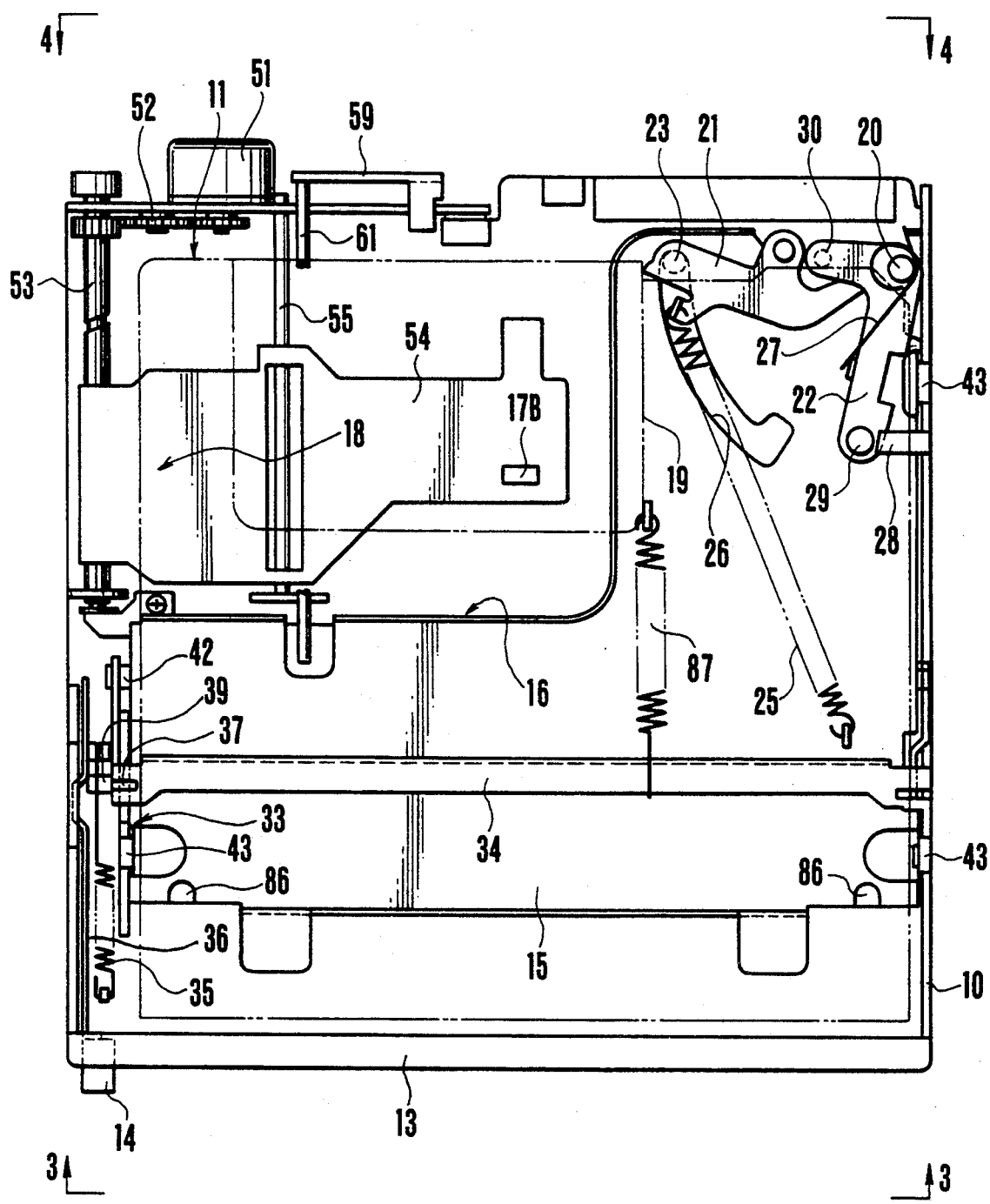
FIG. 2 is a top plan view similar to FIG. 1, and shows a state where the disk drive apparatus of FIG. 1 is placed when the disk cassette is in its load position.
Figure 3:
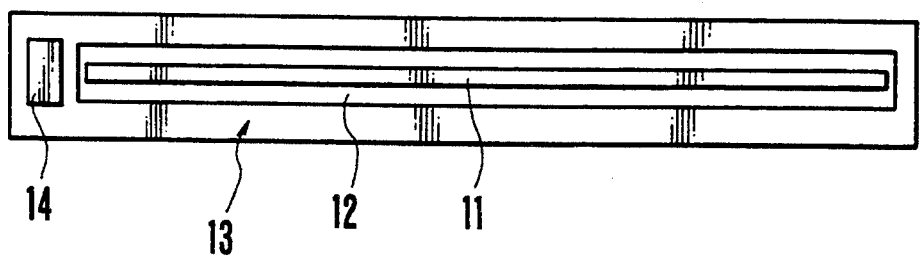
FIG. 3 is a front elevational view of the disk drive apparatus, taken along line 3—3 of FIG. 2.
Figure 4:
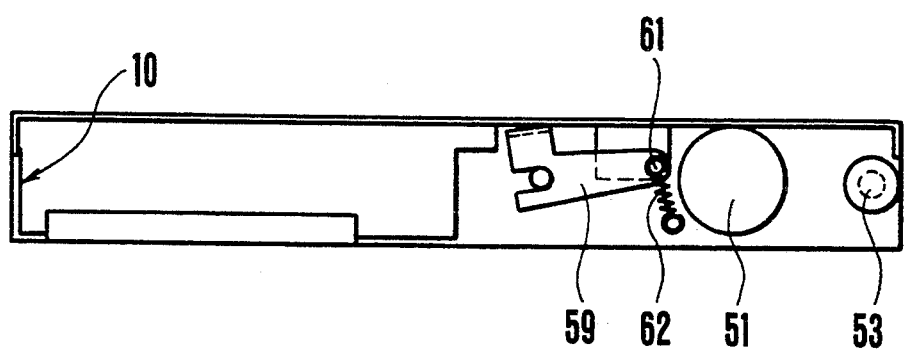
FIG. 4 is a rear elevational view of the disk drive apparatus, taken along line 4—4 of FIG. 2.

Preferred embodiments of the present invention will be described below with reference to the accompanying drawings. Throughout all the drawings that will be referred to below, the same reference numerals are used to denote the same or similar elements. FIGS. 1 and 4 are diagrammatic views showing one embodiment of a disk drive apparatus to which the present invention is applied. FIG. 1 is a diagrammatic top plan view, with a cover omitted for the sake of clarity, of the arrangement of internal elements of the disk drive apparatus in which a disk cassette is placed in its unload position. FIG. 2 is a top plan view similar to FIG. 1, and shows the arrangement of internal elements of the disk drive apparatus in which the disk cassette is placed in its load position. FIG. 3 is a front elevational view of the disk drive apparatus, taken along line 3—3 of FIG. 2. FIG. 4 is a rear elevational view of the disk drive apparatus, taken along line 4—4 of FIG. 2.

Various constituent parts are accommodated in a base 10 having a box-like shape with a top side open, as shown in FIGS. 1 and 2. The base 10 is formed as a thin structure made of a metal such as aluminum, and the top side of the base 10 is covered with a cover (not shown) formed of a thin plate made of a non-magnetic material, such as aluminum, for the purposes of magnetic shielding, dust protection and the like. A front panel 13 is attached to the base 10 to cover a front face thereof. As shown in FIG. 3, the front panel 13 has a cassette inserting slot 12 for permitting insertion and ejection of a disk cassette 11. A push button (eject button) 14 which is operated to eject the inserted disk cassette 11 is provided in the left-hand end portion of the front panel 13 as viewed in FIG. 3.

Referring again to FIGS. 1 and 2, a cassette guide 15 for guiding the disk cassette 11 during insertion, ejection, loading and unloading is held in the base 10 for movement in the upward and downward directions as well as in the forward and rearward directions. The cassette guide 15 has a cross-sectional shape which serves to guide and hold the disk cassette 11 inserted from the forward direction. In the shown example, the cassette guide 15 has an approximately square, but partially cut out shape as viewed in top plan, that is to say, a cutout portion 16 is formed in the cassette guide 15 by removing an approximate left half of a rear portion thereof (i.e., an area equivalent to approximately ¼ of the entire area of the cassette guide 15). The cassette guide 15 is held in a position which is displaced to the right with respect to the position of the base 10 (i.e., a position which is relatively offset from that of the base 10 in the rightward direction). A portion in the base 10 that is adjacent to the left-hand edge of the cassette guide 15 is formed as a space in which other constituent parts are disposed.

As shown in FIGS. 1 and 2, a head seek mechanism 18, which has head means 17 (an upper head 17A and a lower head 17B) for effecting recording or reproduction of information on or from a disk (information medium) accommodated in the disk cassette 11, is disposed in an area corresponding to the cutout portion 16 of the cassette guide 15. The head seek mechanism 18 is a mechanism for causing the head means 17 to move to an arbitrary track position (for the purpose of a seek operation) on the disk in the radial direction thereof.

A magnetic disk is generally accommodated in the disk cassette 11 as the information medium, and is externally accessible, as by opening a slidable shutter 19 provided on the disk cassette 11 and loading the head means 17 onto the magnetic disk through a corresponding head access opening.

As shown in FIGS. 1 and 2, a vertical shaft 20 is provided on the right-hand rear portion of the cassette guide 15, and a shutter lever 21 and a latch lever 22 are pivotally supported by the vertical shaft 20 for pivotal motion on the vertical shaft 20 above the cassette guide 15. The shutter lever 21 serves to open and close the shutter 19 which covers the head access opening of the disk cassette 11, in association with the insertion and ejection of the disk cassette 11. A pin 23, which can be brought into abutment with the leading end of the disk cassette 11, as viewed in the direction of disk-cassette insertion, as well as with one edge of the shutter 19, is provided on the bottom surface of an extending end portion of the shutter lever 21. The shutter lever 21 is urged in the counterclockwise direction (in the direction of left-hand rotation) as viewed in FIG. 1 or 2, by a spring which is held between the shutter lever 21 and the cassette guide 15. A slot 26 is formed in the top of the cassette guide 15, and has a shape of predetermined length according to the locus of movement of the pin 23 so that the pin 23 is allowed to move along the locus of movement.

As shown in FIGS. 1 and 2, the latch lever 22 is urged by a latch spring 27 in the counterclockwise direction (in the direction of left-hand rotation) as viewed in the figures. If the disk cassette 11 is placed in the unload position, a roller 29 provided on one end portion of the latch lever 22 is engaged with a stopper 28 formed on the base 10 so that the latch lever 22 is placed in its latched state, as shown in FIG. 1. The other end portion of the latch lever 22 is provided with a pin 30 which can be brought into abutment with the leading end of the inserted disk cassette 11. In the above-described manner, a latch mechanism is disposed on a side of the cassette guide 15 which is opposite to the cutout portion 16, that is, a side of the cassette guide 15 which is opposite to the side on which the above-described head seek mechanism 18 and a cassette loading mechanism 33 (to be described later) are disposed (or, a side of the cassette guide 15 which is opposite to the side on which the space is formed by displacing the cassette guide 15 and the disk cassette 11 to the right in the above-described manner).

Figure 5A:
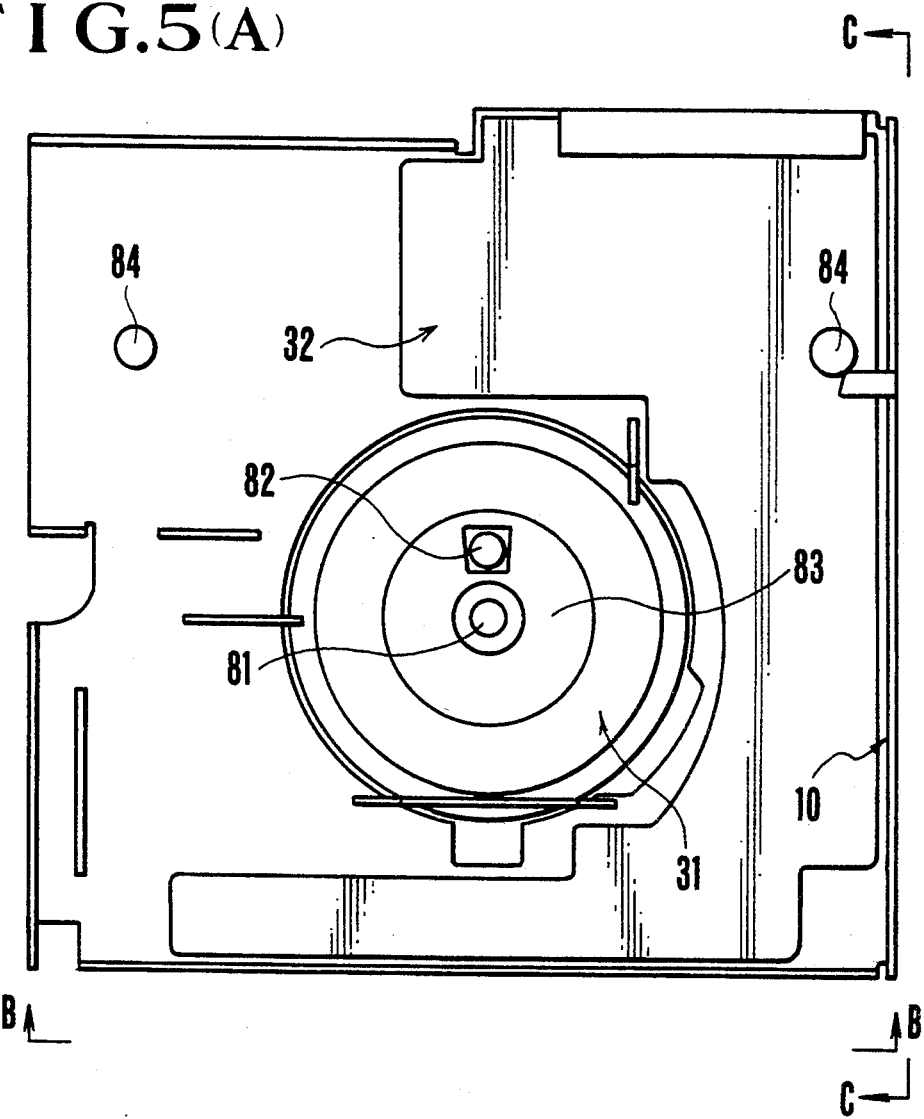
FIGS. 5(A), 5(B) and 5(C) are diagrammatic views showing the arrangement of parts mounted on the bottom of a base of the disk drive apparatus of FIG. 1, FIG. 5(A) being a top plan view, FIG. 5(B) being a front elevational view taken along line B—B of FIG. 5(A), and FIG. 5(C) being a side elevational view taken along line C—C of FIG. 5(A)
Figure 5B:
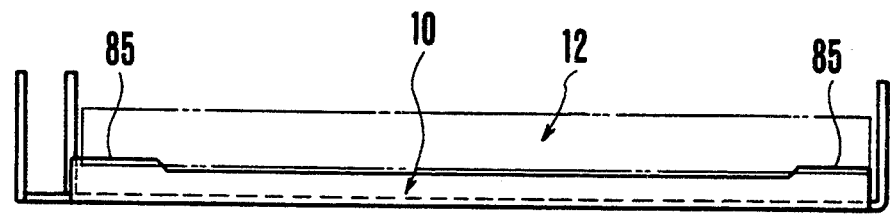
Figure 5C:
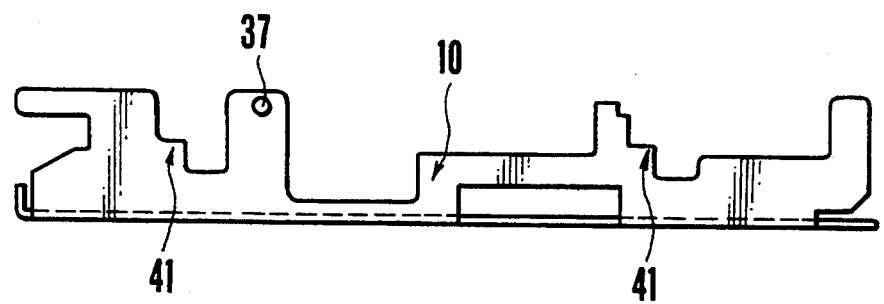

FIGS. 5(A), 5(B) and 5(C) are diagrammatic views showing parts mounted on the bottom of the base 10, with the cassette loading mechanism and the head seek mechanism omitted for the sake of clarity. FIG. 5(A) is a top plan view, FIG. 5(B) is a front elevational view taken along line B—B of FIG. 5(A), and FIG. 5(C) is a side elevational view taken along line C—C of FIG. 5(A). As shown in FIGS. 5(A) to 5(C), a disk-shaped flat motor 31 for disk driving is disposed approximately in the center of the bottom of the base 10, and the motor 31 is provided with a center shaft 81 which engages with the center hole (not shown) of the disk cassette 11, a driving pin 82 which engages with a driving hole (not shown) provided in the vicinity of the center hole of the disk cassette 11, and a magnet 83 for holding the hub of the disk by attraction. Rearward of the motor 31 are disposed positioning pins 84 for positioning the disk cassette 11 when the disk cassette 11 is in its loaded state. Positioning faces 85 are formed on the base 10 by partially raising a portion of the base 10 which is adjacent to the cassette inserting slot 12 (refer to FIG. 3). A printed circuit board 32 for controlling the disk drive apparatus is mounted on the base 10 in such a manner as to partially surround the motor 31.

As shown in FIGS. 1 and 2, the cassette loading mechanism 33 for selectively moving the cassette guide 15 to the load and unload positions is disposed in the space which is formed in the base 10 along the left-hand edge of the cassette guide 15. An operating lever 34 is provided on the base 10, which extends transversely above the cassette guide 15 and which is pivotally supported at its opposite ends on the base 10. A button lever 36 of the cassette loading mechanism 33 is normally urged in the direction of the cassette inserting slot 12 by a return spring 35. If the eject button 14 is pressed, the button lever 36 is moved rearward against the urging force of the return spring 35. The pivotal position of the operating lever 34 is restricted by the button lever 36, and the cassette guide 15 is selectively moved toward the load and unload positions in accordance with the pivotal position of the operating lever 34.

Figure 6:
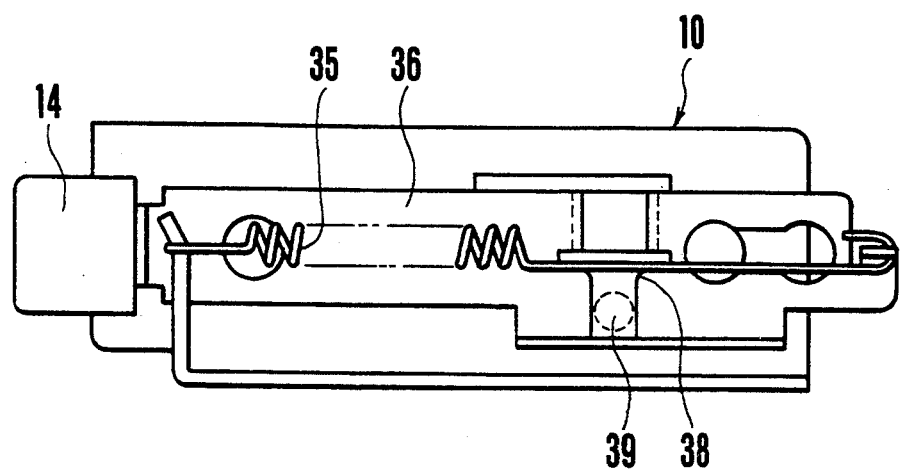
FIG. 6 is a fragmentary side elevational view showing a state where the button lever shown in FIG. 1 is placed when the disk cassette is in the unload position.
Figure 7:
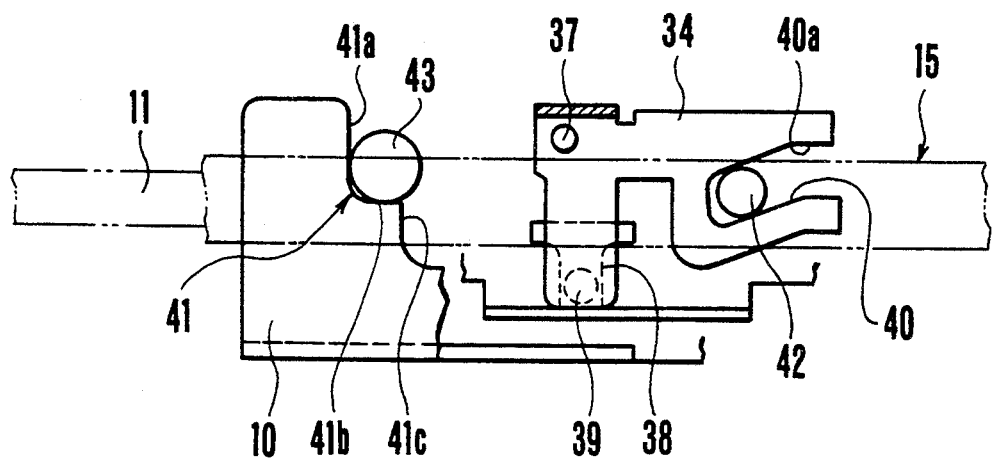
FIG. 7 is a fragmentary side elevational view showing a state where the operating lever and the cassette guide shown in FIG. 1 are placed when the disk cassette is in the unload position.
Figure 8:
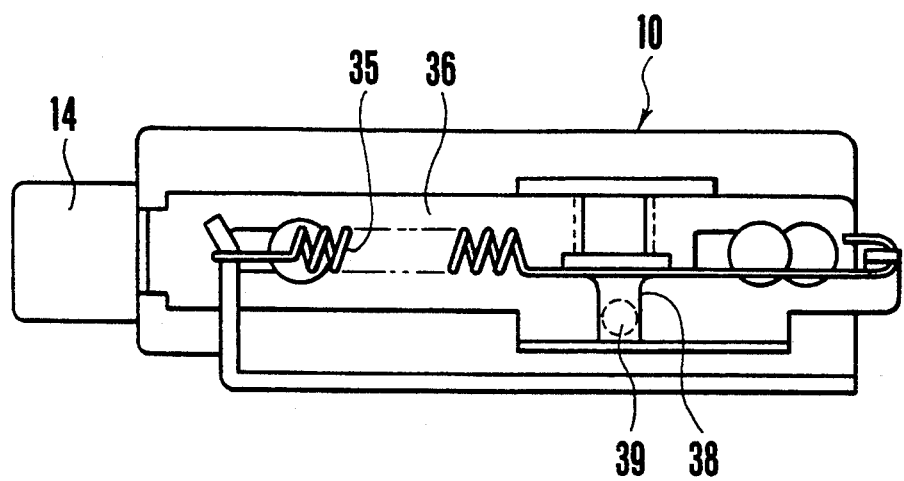
FIG. 8 is a fragmentary side elevational view showing a state where the button lever shown in FIG. 2 is placed when the disk cassette is in the load position.
Figure 9:
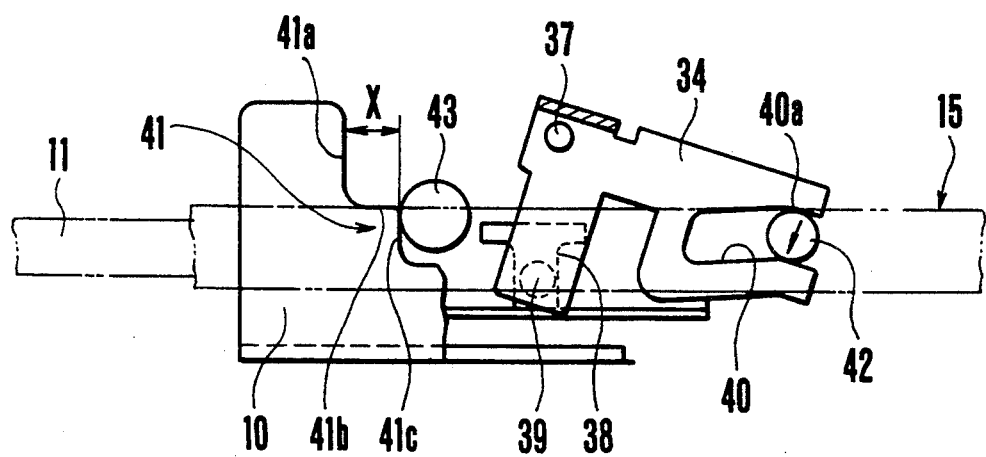
FIG. 9 is a fragmentary side elevational view showing a state where the operating lever and the cassette guide shown in FIG. 2 are placed when the disk cassette is in the load position.

FIGS. 6 to 9 are fragmentary side elevational views showing the state of the cassette loading mechanism 33 when the disk cassette 11 is in the load position, as well as the state of the cassette loading mechanism 33 when the disk cassette 11 is in the unload position. FIG. 6 shows the state of the button lever 36 when the disk cassette 11 is in the unload position, FIG. 7 shows the state of the operating lever 36 and that of the cassette guide 15 when the disk cassette 11 is in the unload position, FIG. 8 shows the state of the button lever 36 when the disk cassette 11 is in the load position, and FIG. 9 shows the state of the operating lever 34 and that of the cassette guide 15 when the disk cassette 11 is in the load position.

The aforesaid button lever 36 is supported for sliding motion with respect to the base 10 in the forward and rearward directions thereof by a slide guide portion made up of a pin and a slot, and is normally urged to the left (in the forward direction) as viewed in FIG. 6 by the return spring 35. The operating lever 34 is supported at its opposite ends for pivotal motion on support points 37 provided on the base 10. A cutout 38 formed in the button lever 36 is engaged with a pin 39 provided on one end portion of the operating lever 34.

Cam slots 40 are respectively formed in the opposite end portions of the operating lever 34, and holding parts 41 each having a staircase-like edge portion are provided on the opposite ends of the base 10, respectively. The opposite sides of the cassette guide 15 are respectively provided with center pins 42 as well as rollers 43. The center pins 42 engage with the associated cam slots 40 formed in the opposite end portions of the operating lever 34, and the rollers 43 abut the associated holding parts 41 of the base 10. Since the shape of the cassette guide 15 is such that the approximate left half of the rear portion is cut out as shown in FIGS. 1 and 2, the holding parts 41 and the rollers 43 are provided at a total of three selected locations, one left-hand location and two forward and rearward locations.

The operation of each part during the loading and unloading of the disk cassette 11 will be described below with reference to FIGS. 1 through 9. When the disk cassette 11 is inserted through the cassette inserting slot 12 (refer to FIG. 3), the leading end of the disk cassette 11 as viewed in the direction of disk-cassette insertion comes into abutment with the pin 23 of the shutter lever 21 (refer to FIGS. 1 and 2), thereby causing the shutter lever 21 to turn in the clockwise (right-hand) direction as viewed in FIG. 1. At this time, the pin 23 of the shutter lever 21 (refer to FIGS. 1 and 2) is brought into abutment with one edge of the shutter 19 to cause the shutter 19 to move against a return spring (not shown) in accordance with the turn of the shutter lever 21 (the insertion of the disk cassette 11), thereby opening the head access opening. Thus, the head means 17 is allowed to access the disk (medium).

Then, the leading end of the disk cassette 11 comes into abutment with the pin 30 of the latch lever 22 (refer to FIGS. 1 and 2). When the disk cassette 11 is pressed to a further extent (in the direction of disk-cassette insertion), the latch lever 22 turns in the clockwise direction (in the direction of right-hand rotation) as viewed in the figures, so that the roller 29 of the latch lever 22 is disengaged from the stopper 28 of the base 10. By the disengagement of the latch mechanism, the cassette guide 15 arrested by the roller 29 is allowed to move to a further extent toward the rear end of the apparatus (to the right as viewed in FIG. 7). The stop position of the leading end of the disk cassette 11 within the cassette guide 15 in the direction of disk-cassette insertion is restricted by the pin 23 coming into abutment with the rearward end of the slot 26 (refer to FIG. 2).

When the disk cassette 11 is pressed to a further extent, the cassette guide 15 moves together toward the rear end of the apparatus. Therefore, the center pins 42 of the cassette guide 15 (refer to FIGS. 7 and 9) move horizontally toward the rear end of the apparatus (to the right as viewed in the figures) in the respective cam slots 40 of the operating lever 34. In addition, the urging force of the return spring 35 acts on the pin 39 of the operating lever 34 via the button lever 36 to cause the operating lever 34 to turn, thereby causing the operating lever 34 to turn on the support points 37 from the position shown in FIG. 7 in the clockwise direction (in the direction of right-hand rotation) as viewed in the figure. At the same time, the rollers 43 (provided at three locations) of the cassette guide 15 also move toward the rear end of the apparatus along horizontal portions 41b the respective holding parts 41. Since the pin 39 moves toward the left as viewed in FIG. 7 by the turn of the operating lever 34, the button lever 36 also moves accordingly. When the disk cassette 11 is pressed to a further extent, the rollers 43 of the cassette guide 15 move down along corresponding lower vertical portions 41c of the staircase-like edge portions of the holding parts 41. Thus, the cassette guide 15 is placed in the cassette-loaded state shown in FIG. 9 (the state in which the disk cassette 11 is placed in the load position).

During the cassette-loaded state in which the cassette guide 15 is moved down, the position of the cassette guide 15 with respect to the direction of disk-cassette insertion is restricted by the abutment of the rollers 43 of the cassette guide 15 with the respective lower holding portions (vertical portions) 41c of the staircase-like edge portions of the holding parts 41. In addition, during such a cassette-loaded state, the disk cassette 11 is positioned in the loaded state by the positioning pins 84 and the positioning faces 85, and the cassette guide 15 is urged in the downward direction by the downward urging force of the operating lever 34. Accordingly, the disk cassette 11 is positioned in such a way that its top face is pressed by a plurality of disk-cassette pressing projections 86 (refer to FIGS. 1 and 2) provided on the cassette guide 15, whereby the load position of the cassette guide 15 is restricted. If the cassette guide 15 is placed in the load position, the disk (to be exact, the hub) within the disk cassette 11 is magnetically attracted to the rotor of the motor 31 for disk driving (refer to FIG. 5) and is also engaged with the center shaft 81 and the driving pin 82 on the rotor, whereby the disk (medium) is positioned in the direction of disk height and in the direction of disk rotation. Accordingly, the disk cassette 11 is set in the cassette-loaded state in which recording and reproduction of information on and from the disk are possible.

During the cassette-loaded state, the center pins 42 of the cassette guide 15 are respectively urged leftwardly obliquely in the downward direction as viewed in FIG. 9 by open-side end portions 40a of the upper cam surfaces of the corresponding cam slots 40. In the above-described manner, the positions of the respective rollers 43 of the cassette guide 15 in the direction of disk-cassette insertion are restricted by the corresponding lower vertical portions 41c of the holding parts 41, and the cassette guide 15 is stably held with respect to the base 10.

When the disk cassette 11 set in the disk drive apparatus is to be ejected, the eject button 14 (refer to FIGS. 3 and 8) is pressed to cause the button lever 36 to move in the rearward direction against the return spring 35. When the button lever 36 is moved rearward, the operating lever 34 turns on the support points 37 from the position shown in FIG. 9 in the counterclockwise direction (in the direction of left-hand rotation) as viewed in the figure, by means of the engagement between the cutout 38 of the button lever 36 and the pin 39 of the operating lever 34. Then, the center pins 42 are lifted up by the respective cam slots 40 to cause the cassette guide 15 to move upward. In addition, when the eject button 14 is pressed to a further extent, the cassette guide 15 moves upward accordingly to disengage the rollers 43 from the respective lower holding parts (vertical portions) 41c, whereby the movement of the cassette guide 15 toward the front of the apparatus (to the left as viewed in FIG. 9) becomes possible.

When the eject button 14 is pressed to a further extent, the cassette guide 21 and the latch lever 22 are made to turn rapidly in the counterclockwise direction (in the direction of left-hand rotation) by the urging forces of the respective return springs 25 and 27 (refer to FIGS. 1 and 2), thereby ejecting the disk cassette 11 in the forward direction and, at the same time, moving the cassette guide 15 in the forward direction.

It is to be noted that an elastic member for urging the cassette guide 15 in the forward direction may also be provided for aiding in smooth movement of the cassette guide 15. As an example, in the above-described embodiment, a spring member 87 (refer to FIGS. 1 and 2) is disposed between the operating lever 34 and the cassette guide 15. Instead, the shutter spring 25 may also be utilized in such a manner that one end of the shutter spring 25 is secured to the operating lever 34 or to the base 10 or other fixed elements.

When the shutter lever 21 returns along the slot 26, the pin 23 of the shutter lever 21 is brought into abutment with the forward end of the slot 26 to apply a returning force to the cassette guide 15. Thus, the cassette guide 15 is returned to the initial position shown in FIG. 7. When the pressing of the eject button 14 is stopped, the button lever 36 and the operating lever 34 are returned to their initial positions (unload positions) shown in FIGS. 6 and 7 by the urging force of the return spring 35 (refer to FIGS. 6 and 8).

Figure 13:
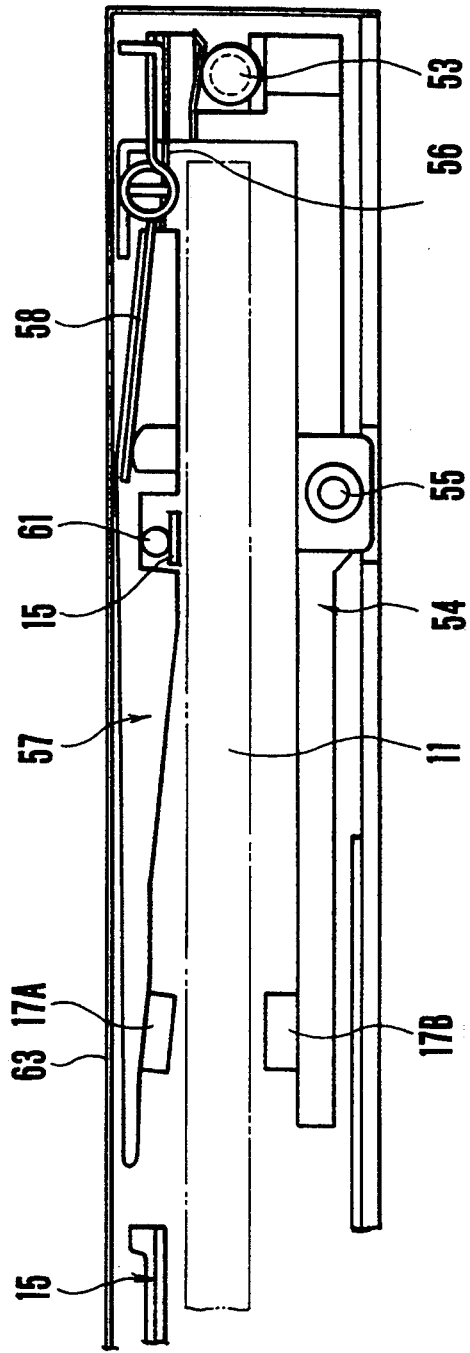
FIG. 13 is a vertical sectional view taken along line 1—1 of FIG. 1, of a portion including the head seek mechanism.

As shown in FIGS. 1 and 2, the head seek mechanism 18 is disposed in the area corresponding to the cutout portion 16 of the cassette guide 15. FIG. 13 is a vertical sectional view taken along line 1—1 of FIG. 1, of a portion including the head seek mechanism 18. The head seek mechanism 18 will be described below with reference to FIGS. 1, 2 and 13 as well as other associated drawings. In the shown example, the cutout portion 16 having an area corresponding to approximately ¼ of the entire area of the cassette guide 15 is formed in the left-hand half of the rear portion thereof. However, a corresponding cutout portion may be formed not in the left-hand half but in the right-hand half, in which case a mechanism corresponding to the head seek mechanism 18 may be provided within the right-hand cutout portion.

Referring to FIGS. 1, 2 and 13, the cassette loading mechanism 33 and the head seek mechanism 18 are arrayed along one edge (in the shown example, the left-hand edge) of the disk cassette 11 in the inserting direction of the disk cassette 11, on the side on which the cassette loading mechanism 33 including the button lever 36 and the associated elements is disposed, that is, within the space that is formed adjacent to the one edge of the cassette guide 15 by displacing the cassette guide 15 with respect to the base 10 in one direction (in the shown example, in the right-hand direction).

The head seek mechanism 18 is provided with a head driving motor 51 fixed to the rear wall of the base 10, a driving shaft 53 made from a lead screw which is rotated by the motor 51 via a gear train 52, a head carriage 54 engaged with the lead screw of the driving shaft 53 and arranged for movement in opposite directions along the length of the driving shaft 53 by the forward and reverse rotations of the driving shaft 53, a guide bar 55 engaged with the head carriage 54 for guiding the head carriage 54, a lower head 17B mounted on an extending end portion of the head carriage 54, a head arm 57 secured to the head carriage 54 via a lead spring 56 for movement in the upward and downward directions, the upper head 17A mounted on an extending end portion of the head arm 57, and a head loading spring 58 for urging the head arm 57 in the downward direction (toward a head load position).

As shown in FIGS. 1 and 4, a support arm 59 is pivotally supported on the base 10, and one end of a bar 61 for head lifting (head unloading) is secured to an extending end portion of the support arm 59. The bar 61 extends past the underside of the head arm 57 so that the other end portion of the bar 61 engages with the top surface of the cassette guide 15. The support arm 59 is normally urged in the direction in which the bar 61 for head lifting is brought into abutment with the top surface of the cassette guide 15, that is, in the downward direction, by a spring 62 disposed between the support arm 59 and the base 10. Accordingly, during the cassette-unloaded state in which the cassette guide 15 is moved upward, the head arm 57 is lifted to the upper position shown in FIG. 13 so that the upper head 17A is held in its unload position.

Figure 10:
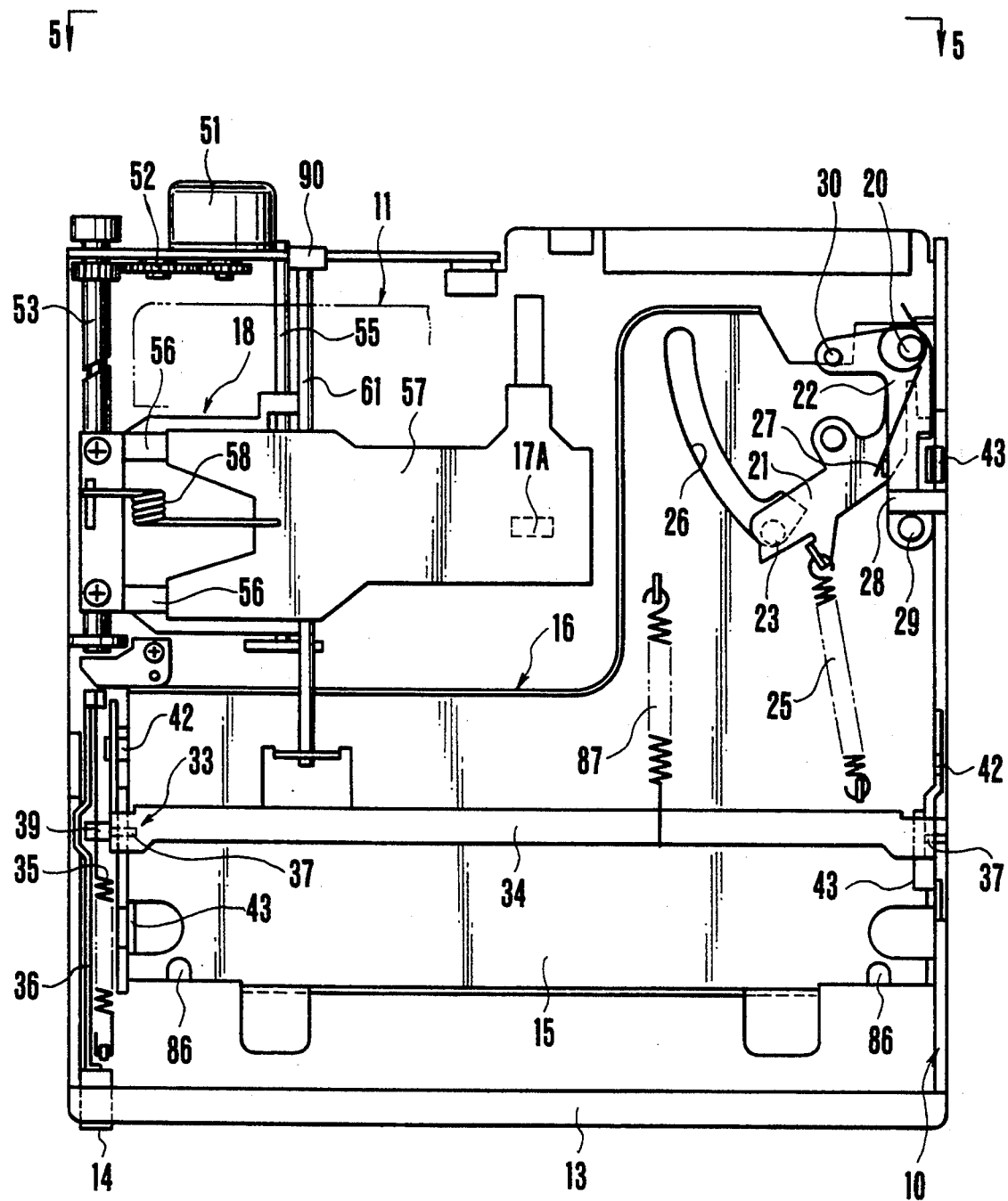
FIG. 10 is a diagrammatic top plan view showing a head lifting mechanism according to another embodiment of the present invention.
Figure 11:
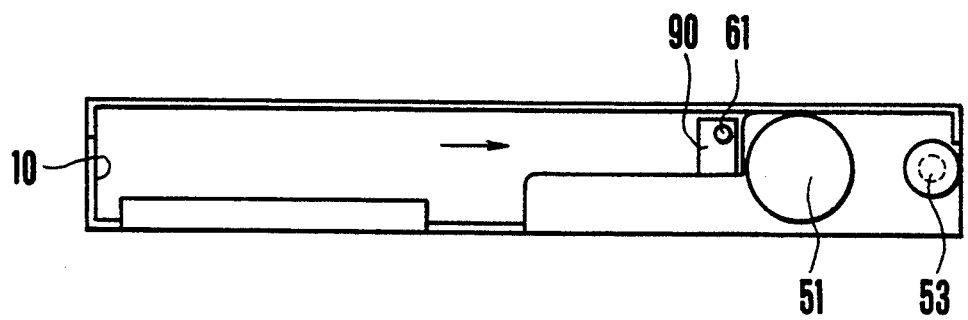
FIG. 11 is a rear elevational view taken along line 5—5 of FIG. 10.

Although the above-described head lifting mechanism is adopted in the aforesaid embodiment, a head lifting mechanism which will be described below may be adopted. The head lifting mechanism will be described below with reference to FIGS. 10 to 12.

On the side on which the cutout portion 16 is formed in the cassette guide 15, the bar 61 for head lifting (head unloading) extends past the underside of the head arm 57, and one end of the bar 61 is fixed to the cassette guide 15 with the other end secured to an engagement portion 90. As shown by solid lines in FIG. 12, the bar 61 is arranged to engage with the base 10 when the upper and lower heads 17A and 17B are unloaded. An inclined portion 90a is formed in the bottom end portion of the engagement portion 90 so that the engagement portion 90 can easily engage with the base 10 when the upper and lower heads 17A and 17B are unloaded.

With the above-described arrangement and construction, during the cassette-unloaded state in which the cassette guide 15 is moved upward, the head arm 57 is lifted to the upper position shown in FIG. 13 so that the upper head 17A is held in the unload position. The bar 61 is arranged to support the head arm 57 approximately at the middle position between the point where the head arm 57 is secured and the point on the head arm 57 where the upper head 17A is held, thereby making it possible to reduce the thickness of the apparatus while taking account of a force resisting the urging force of the spring 58.

Figure 12:
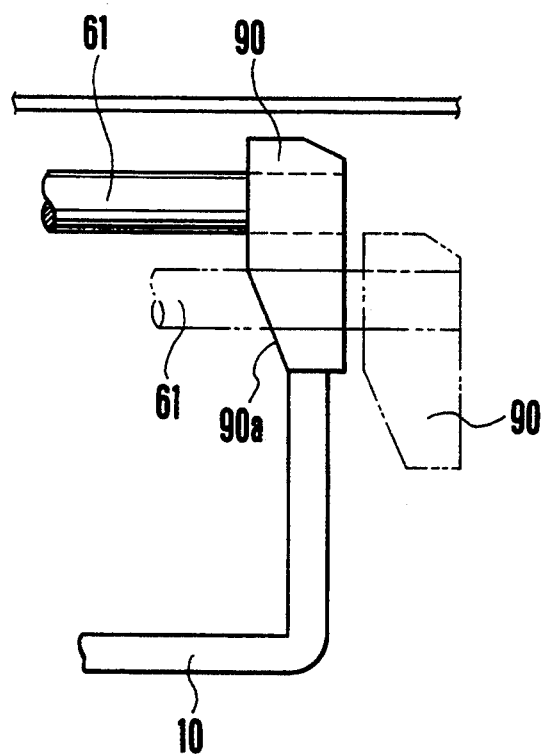
FIG. 12 is a schematic view aiding in explaining the operation of the head lifting mechanism shown in FIG. 10.

During a head loading operation, as the cassette guide 15 moves rearward, the engagement portion 90 disengages from the base 10 as shown by two-dot chain lines in FIG. 12, and the other end of the bar 61 is placed in a free state.

The disk drive apparatus according to the above-described embodiment is arranged to be able to simultaneously load the respective upper and lower heads 17A and 17B onto the top and bottom sides of the medium (disk) incorporated in the disk cassette 11. FIG. 13 shows the state in which the cassette guide 15 and the upper and lower heads 17A and 17B are placed in their unload positions. The aforesaid embodiment is arranged in such a manner that when the cassette guide 15 and the upper and lower heads 17A and 17B are placed in their unload positions, the upper face (the highest portion) of the cassette guide 15 and the upper face (the highest portion) of the head arm 57 are approximately as high as each other, i.e., approximately flush with each other. In addition, the aforesaid embodiment has an arrangement which makes it possible to make the height (thickness) of the disk drive apparatus as small as possible by minimizing the gap between the upper face of the cassette guide 15 or that of the head arm 57 and a cover 63, which covers the open top of the base 10 (refer to FIG. 13), when the disk cassette 11 is placed in the unloaded state as shown in FIG. 13.

Referring again to FIGS. 1, 2 and 13, the driving shaft 53 for a head seek operation, which is made from the aforesaid lead screw, is disposed in the left-hand end portion of the base 10 and along the left-hand edge of the disk cassette 15 so as to extend in the direction of disk-cassette insertion. As shown, the driving shaft 53 is disposed in the vicinity of the rear end of the head arm 57 in such a manner that the axis of the driving shaft 53 and that of the head arm 57 are mutually perpendicular.

Figure 14:
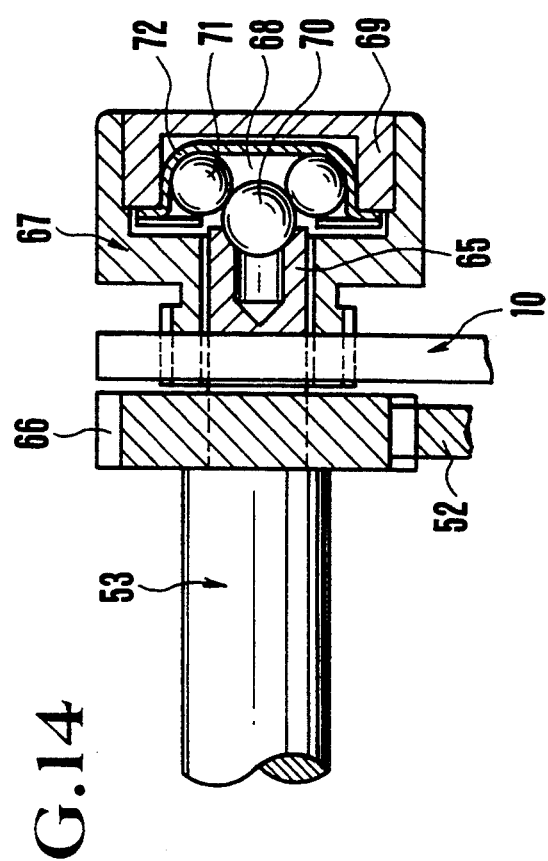
FIG. 14 is a partially vertical sectional view showing a bearing structure provided at each end of the driving shaft of the head seek mechanism of FIG. 1.

FIG. 14 is a partially vertical sectional view showing a bearing structure provided at each end of the driving shaft (lead screw) 53. Since the bearing structures at both ends of the driving shaft 53 have substantially the same construction, the following description refers to only the shown bearing structure provided at one end (the rear end), and description of the bearing structure at the other end is omitted for the sake of simplicity. Referring to FIG. 14, the driving shaft 53 has a support portion 65 and a gear 66 fixed to the support portion 65, and a rotational force from the motor 51 is transmitted to the gear 66. A bearing holder 67 is secured to the rear wall of the base 10 by screw-fitting in such a manner that the position of the driving shaft 53 can be adjusted in the axial direction. The driving shaft 53 can move to and fro in the axial direction by the rotation of the bearing holder 67 so that the track position of the head means 17 can be adjusted. The support portion 65 of the driving shaft 53 projects from the gear 66 in the rearward direction, and the projecting portion extends into the bearing holder 67. A bearing chamber 68 having an open rear end is formed in the rear (outside) of the bearing holder 67, and the bearing chamber 68 is airtightly covered with a cap 69.

As shown in FIG. 14, a sun ball 70 abuts a bearing surface formed in the end face of the support portion 65 of the driving shaft 53, and a plurality of (for example, 3 to 6) planetary balls 71 are disposed, as illustrated, in abutment with the sun ball 70 within the bearing chamber 68. The planetary balls 71 are held by a casing 72 which is disposed outside of the planetary balls 71 to surround them. The cap 69 is airtightly fitted into the bearing holder 67 (as by press-fitting or fitting using an adhesive) with the balls (the single sun ball 70 and the plurality of planetary balls 71) disposed in the above-described manner, thereby constituting a rotary bearing for supporting both of the radial and thrust loads of the driving shaft 53. In the above-described embodiment, although the lead screw (driving shaft) 53 is employed as a transmission means for driving the head seek mechanism 18, a transmission means made up of a rack-and-pinion mechanism, a linear motor or the like may be substituted for the lead screw 53. The output of the motor 51 may be transmitted to the driving shaft 53 by means of a belt or the like.

According to the embodiment described above with specific reference to FIGS. 1 to 9 as well as the associated figures, in a disk drive apparatus for carrying out recording or reproduction of information on or from a disk, which serves as a recording medium, by moving the heads 17A and 17B on the disk in a predetermined direction while rotating the disk, the operating lever 34 is supported for pivotal motion on the base 10, and the cassette guide 15 for guiding and holding the disk cassette 11 is arranged to selectively move to the load position and to the unload position by means of the pivotal motion of the operating lever 34. Accordingly, it is possible to selectively move the cassette guide 15 to the load position and to the unload position by a compact construction using a reduced number of parts. In addition, it is possible to provide a disk drive apparatus which is made up of a reduced number of parts and which is also reduced in size and weight.

In addition to the above-described arrangement and construction, the operating lever 34 is disposed for pivotal motion with respect to the base 10 of the apparatus about the support points 37 each having an axis perpendicular to the inserting direction of the disk cassette 11. In addition, the load and unload positions of the cassette guide 15 are restricted by the engagement of the cassette guide 15 with the operating lever 34 as well as the engagement of the cassette guide 15 with the base 10 by means of the center pins 42 and the associated rollers 43 of the cassette guide 15. Accordingly, it is, therefore, possible to selectively move the cassette guide 15 to the load position and to the unload position by using a far more efficient, compact arrangement made up of a reduced number of parts, whereby it is possible to provide a disk drive apparatus which can be reduced in cost, size and weight.

According to the embodiment described above with specific reference to FIGS. 1, 2 and 13 as well as the associated figures, the driving shaft 53, for driving the head carriage 54 having the lower head 17B for recording and reproduction to cause it to perform a seek operation, is disposed in proximity to one edge of the disk cassette 11 in such a manner as to extend in the inserting direction of the disk cassette 11. Accordingly, it is possible to easily reduce the length and thickness of the disk drive apparatus, whereby it is possible to reduce the size and weight of the apparatus to a further extent.

In addition to the above-described arrangement and construction, the driving shaft 53 is disposed in the vicinity of the rear end of the head arm 57 having the upper head 17A, in such a manner that the axis of the driving shaft 53 and that of the head arm 57 are mutually perpendicular. In addition, a cutout portion 16, which corresponds to an area in which the head seek mechanism 18 including the head arm 57 is disposed, is formed in the cassette guide 15 for guiding the disk cassette 11, and the driving shaft 53 is made from a lead screw. It is possible to easily reduce the length and thickness of the apparatus far more efficiently, whereby it is possible to reduce the size and weight of the apparatus to a further extent.

According to the embodiment described above with specific reference to FIG. 1, 2 and 13 as well as the associated figures, the cutout portion 16 having an area corresponding to approximately ¼ of the entire area of the cassette guide 15 is formed in the left-hand half of the rear portion thereof, and the head seek mechanism 18 is disposed within the area of the cutout portion 16. Accordingly, it is possible to reduce the length and thickness of the disk drive apparatus, whereby it is possible to provide a disk drive apparatus which can be reduced in size and weight.

In addition to the aforesaid arrangement and construction, when the cassette guide 15 is placed in the unload position (lifted position), the upper face of the cassette guide 15 and the upper face of the head arm 57 are approximately flush with each other. In addition, the cutout portion 16 for accommodating the head arm 57 is provided in an area corresponding to approximately ¼ of the entire area of the cassette guide 15 in the left-hand or right-hand half of the rear portion thereof. Accordingly, it is possible to reduce the length and thickness of the disk drive apparatus far more efficiently, whereby it is possible to provide a disk drive apparatus which can be reduced in size and weight.

According to the embodiment described above with specific reference to FIGS. 1, 2 and 13 as well as the associated figures, the lateral position of the cassette guide 15 for guiding the disk cassette 11 is displaced toward one side from the center line of the apparatus, whereby a corresponding space is formed in the apparatus on the other side thereof. Within the space, there are disposed the cassette loading mechanism 33 for selectively moving the cassette guide 15 to the load position and to the unload position and the head seek mechanism 18 for moving the upper and lower heads 17A and 17B to cause them to perform a seek operation. Accordingly, it is possible to reduce the length, width and thickness of the disk drive apparatus far more efficiently, whereby it is possible to provide a disk drive apparatus which can be reduced in width and weight.

In addition to the above-described arrangement and construction, the cassette loading mechanism 33 and the head seek mechanism 18 are arrayed in the inserting direction of the disk cassette 11, and in addition the latch mechanism 22 for selectively arresting and releasing the cassette guide 15 is disposed on a side opposite to the side where the cassette loading mechanism 33 and the head seek mechanism 18 are disposed. Accordingly, it is possible to reduce the length, width and thickness of the disk drive apparatus far more efficiently, whereby it is possible to provide a disk drive apparatus which can be reduced in width and weight.

According to the above-described embodiment described above with specific reference to FIGS. 10 to 12 as well as the associated figures, in a disk drive apparatus for carrying out recording or reproduction of information on or from a disk, which serves as a recording medium, by moving the heads 17A and 17B on the disk in a predetermined direction while rotating the disk, there are provided loading/unloading means made up of the bar 61 supported at one end on the cassette guide 15 and the engagement portion 90 secured to the other end of the bar 61. The engagement portion 90 is arranged to engage with the base 10 when the disk cassette 11 is placed in the unload position. Accordingly, the gap between the lower head 17B and the upper head 17A when the disk cassette 11 is placed in the unload position can be made uniform irrespective of the radial position of the heads 17A and 17B on the disk, and it is also possible to reduce the thickness of the apparatus. In addition, it is possible to improve the reliability of the apparatus.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A disk drive apparatus capable of recording or reproducing information on or from a disk-shaped recording medium, comprising:
    (a) a base;
    (b) an operating member turnably supported on said base; and
    (c) a recording medium holding part for holding the disk-shaped recording medium within said disk drive apparatus in such a manner as to cause the recording medium to selectively move to a first location where the recording medium can be inserted or ejected and to a second location where information can be recorded or reproduced on or from the recording medium;

wherein said recording medium holding part moves with an insertion of the recording medium, in a direction of the insertion of the recording medium, while said operating member turns in a predetermined direction in association with said recording medium holding part moving in the direction of the insertion of the recording medium, and when said operating member turns through a predetermined angle, said recording medium holding part reaches the second location.

2. A disk drive apparatus according to claim 1, wherein said operating member is turnable about an axis parallel to the recording medium inserted into said disk drive apparatus.

3. A disk drive apparatus according to claim 2, wherein said operating member includes two lever portions and a member which couples said two lever portions to each other, and is disposed to partially surround a top face and side faces of said recording medium holding part.

4. A disk drive apparatus according to claim 3, further comprising an eject lever responsive to a pressing operation for ejecting, from said disk drive apparatus, the recording medium positioned at the second location, one of said lever portions being arranged to engage with said eject lever.

5. A disk drive apparatus according to claim 4, wherein when said operating member turns through the predetermined angle, said eject lever is positioned at a location where the recording medium is ejectable.

6. A disk drive apparatus according to claim 3, wherein said respective lever portions have cam slots each of which engages with a projection provided on said recording medium holding part.

7. A disk drive apparatus capable of recording or reproducing information on or from a disk-shaped recording medium by moving ahead thereon in a predetermined direction while rotating the disk-shaped recording medium, comprising a driving shaft for causing the head to move, said driving shaft being disposed between a side end of said apparatus and one edge of the recording medium inserted into said disk drive apparatus, in such a manner as to extend in an inserting direction of the recording medium.

8. A disk drive apparatus according to claim 7, wherein the recording medium is accommodated in a cassette.

9. A disk drive apparatus according to claim 7, wherein said driving shaft is disposed in proximity to a rear end of a head arm having the head in such a manner that an axis of said driving shaft and an axis of the head arm are mutually perpendicular.

10. A disk drive apparatus according to claim 7, further comprising a recording medium holding part for holding the recording medium in such a manner as to cause the recording medium to selectively move to a first location where the recording medium can be inserted or ejected and to a second location where information can be recorded or reproduced on or from the recording medium, said recording medium holding part having a cutout portion corresponding to an area in which the head arm is disposed.

11. A disk drive apparatus according to claim 7, wherein said driving shaft is a lead screw.

12. A disk drive apparatus capable of recording or reproducing information on or from a disk-shaped recording medium by moving a head thereon in a predetermined direction while rotating the disk-shaped recording medium, comprising a recording medium holding part for holding the recording medium in such a manner as to cause the recording medium to selectively move to first location where the recording medium can be inserted or ejected and to a second location where information can be recorded or reproduced on or from the recording medium, said recording medium holding part having a cutout portion within which a head seek mechanism for causing the head to move is disposed in large part.

13. A disk drive apparatus according to claim 12, wherein said cutout portion is formed in said recording medium holding part on a leading side relative to an inserting direction of the recording medium.

14. A disk drive apparatus according to claim 13, wherein said cutout portion is formed over approximately ¼ of the entire area of said recording medium holding part.

15. A disk drive apparatus according to claim 12, wherein when said recording medium holding part is placed at the first location, a top face of a head arm for supporting the head is approximately flush with a top face of said recording medium holding part.

16. A disk drive apparatus capable of recording or reproducing information on or from a disk-shaped recording medium by moving a head thereon in a predetermined direction while rotating the disk-shaped recording medium, comprising a recording medium holding part for holding the recording medium in such a manner as to cause the recording medium to selectively move to first location where the recording medium can be inserted or ejected and to a second location where information can be recorded or reproduced on or from the recording medium, the apparatus comprising:
- a head seeking mechanism for causing the head to move;
- a loading mechanism for causing the recording medium holding part to selectively move to the first location and to the second location; and
- wherein a space is formed by displacing said recording medium holding part in a direction parallel to a flat face of the recording medium inserted into said disk drive apparatus and in either one of directions perpendicular to an inserting direction of the recording medium, the loading mechanism and the head seek mechanism being disposed within said space.

17. A disk drive apparatus according to claim 16, wherein the loading mechanism and the head seek mechanism are arrayed in the inserting direction of the recording medium.

18. A disk drive apparatus according to claim 16, wherein a latch mechanism for selectively releasing and arresting said recording medium holding part on a side of said recording medium holding part which is opposite to a location in which the loading mechanism and the head seek mechanism are disposed.

19. A disk drive apparatus capable of recording or reproducing information on or from a disk-shaped recording medium by moving a head thereon in a predetermined direction while rotating the disk-shaped recording medium, comprising:
   (a) a first head and a second head;
   (b) a head carriage which holds the first head and which is moveable in a radial direction of the recording medium;
   (c) a head arm which is supported on said head carriage and which holds the second head opposite to the first head; and
   (d) moving means for causing the second head to selectively move to a first location where recording or reproduction on or from the recording medium is possible and to a second location where recording or reproduction on or from the recording medium is impossible;
   wherein a longitudinal direction of said head carriage and a moving direction of said head carriage are mutually approximately perpendicular,
   said moving means having a support part for supporting, when the second head is positioned at the second location, said head arm in such a manner that said support part extends across said head carriage in the moving direction thereof.

20. A disk drive apparatus according to claim 19, wherein said head arm is pivotally supported at one end on said head carriage so that the second head can move toward and away from the first head, said head arm being urged in a direction in which the second head moves toward the first head, said support part being disposed to support said head arm approximately at a middle position between a point where said head arm is pivotally supported and a point where the second head is held.

21. A disk drive apparatus according to claim 20, wherein said support part has a rod-like shape.

22. A disk drive apparatus according to claim 21, wherein said moving means further including a holder for holding a cassette which accommodates the recording medium, said support part being secured at one end to said holder with another end having an engagement part, said support part being capable of engaging with a base of said disk drive apparatus when the second head is positioned in the second location.

* * * * *

UNITED STATES PATENT AND TRADEMARK OFFICE
CERTIFICATE OF CORRECTION

PATENT NO. : 5,343,457
DATED : August 30, 1994
INVENTOR(S) : Akio Hoshi It is certified that error appears in the above-identified patent and that said Letters Patent is hereby corrected as shown below:

Col. 2, line 66.  Change "are" to -- is --.

Col. 6, line 39.  Change "36" to -- 34 --.

Col. 9, line 33.  Change "is" to -- are --.

Col. 13, lines 22-23.  Delete "described above".

Col. 14, line 36.  Change "ahead" to -- a head --.

Col. 15, line 3.  After "to" insert -- a --.

Col. 15, line 40.  After "to" insert -- a --.

Signed and Sealed this

Twenty-fourth Day of January, 1995

Attest:

BRUCE LEHMAN

*Attesting Officer*     *Commissioner of Patents and Trademarks*